Nov. 23, 1926.
C. O. WEBER
1,608,448
APPLIANCE FOR GRINDING, MILLING, BORING MACHINES AND THE LIKE
Filed June 30, 1925     2 Sheets-Sheet 1
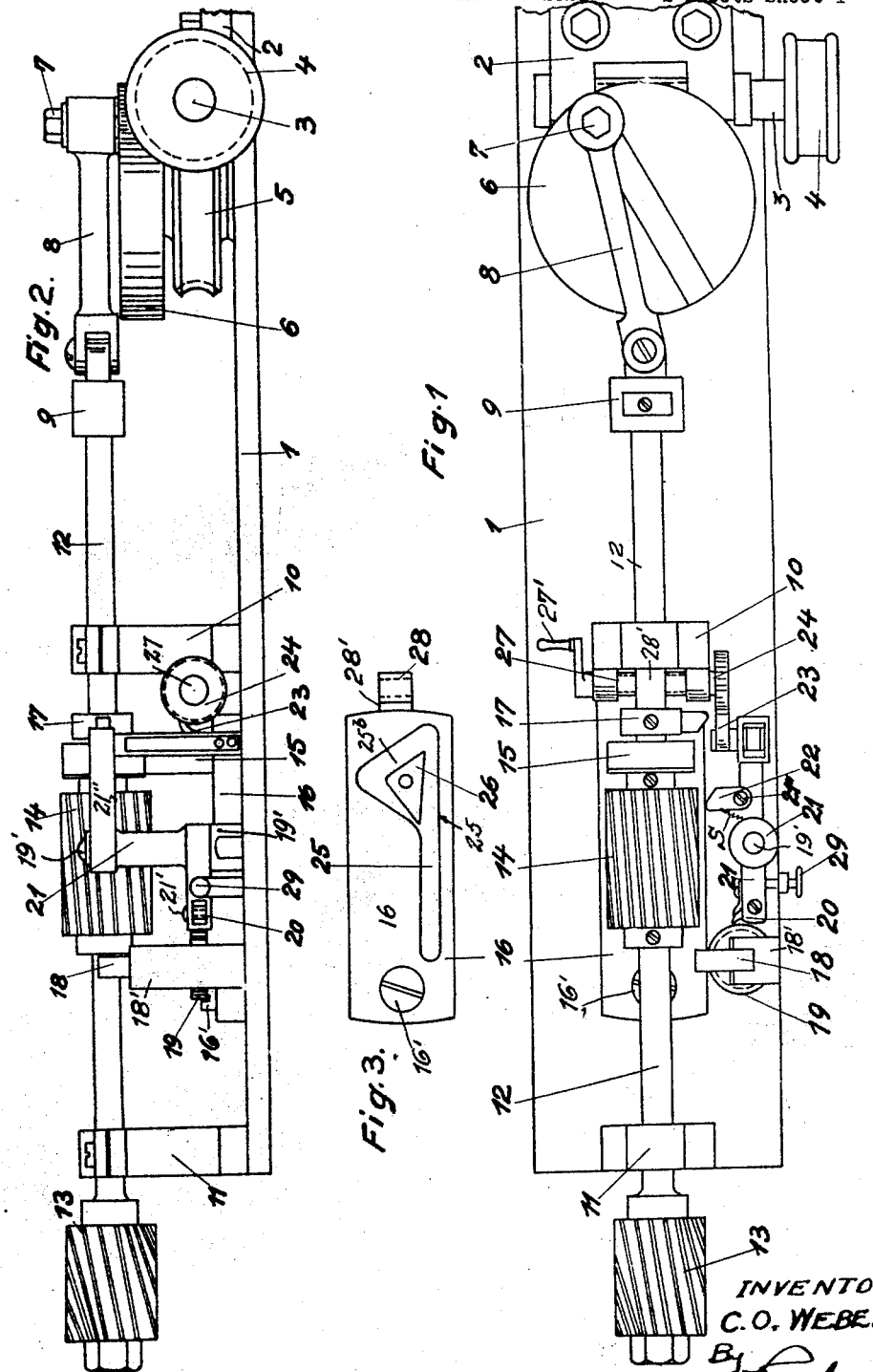
INVENTOR
C. O. WEBER.

Nov. 23, 1926. 1,608,448
C. O. WEBER
APPLIANCE FOR GRINDING, MILLING, BORING MACHINES AND THE LIKE
Filed June 30, 1925   2 Sheets-Sheet 2
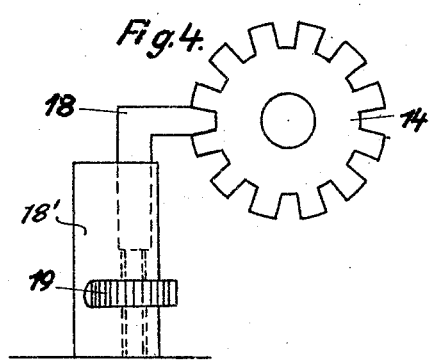
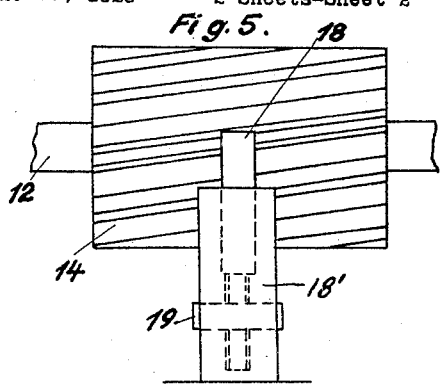
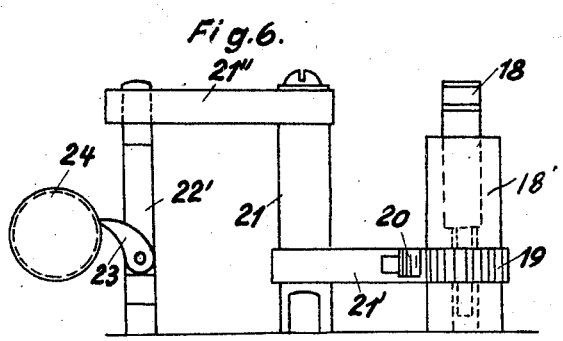
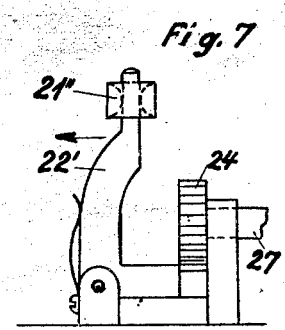
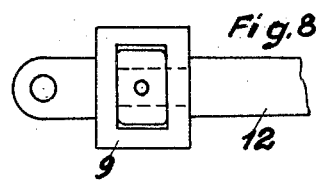
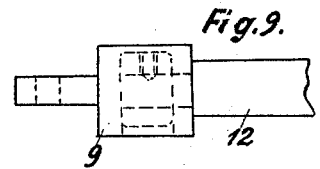
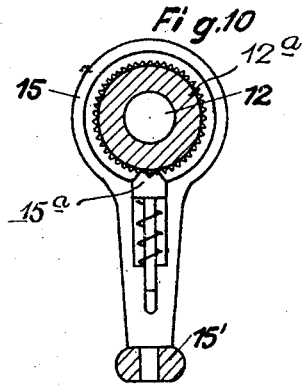
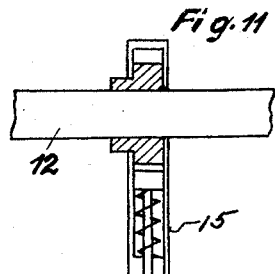
Inventor:
C. O. WEBER Patented Nov. 23, 1926.

1,608,448

UNITED STATES PATENT OFFICE.

CARL OTTO WEBER, OF DRESDEN, GERMANY.

APPLIANCE FOR GRINDING, MILLING, BORING MACHINES AND THE LIKE.

Application filed June 30, 1925, Serial No. 40,572, and in Germany October 26, 1922.

In the grinding and milling process for tools, or similar devices such as for instance twist drills, milling cutters, cog-wheels and the like, the adjustment of the work piece by hand is always connected with great difficulties and even with most careful work it will be impossible to avoid inaccuracies of adjustment.

The object of my invention is to avoid this disadvantage and to devise an appliance for use in connection with machine tools, such as grinding, milling, planing or similar machines, by means of which the work piece will be guided and fed forward fully automatically in order to be subjected in the proper manner to the action of a fixed operating tool. The appliance according to my invention is constructed essentially in such a way, that the shaft, which carries the work piece, for instance a milling cutter, is made to reciprocate relatively to the cutting tool by means of a connecting rod and a crank mechanism, which may be driven by means of a worm gear from any available source of mechanical power. In addition to this reciprocating motion the work piece is rotated during each reciprocating stroke in alternating direction in conformity to the obliquity of the surfaces of the work piece, for instance the teeth or cutting edges of a milling cutter, this alternate rotation being effected by an actuating lever mounted upon the shaft carrying the work piece and a properly shaped curved plate co-operating with said lever. A specimen or model of the work piece, which may be a true duplicate of the latter or which also may be shaped in a certain conformity thereto, is mounted upon the shaft, and guided by a fixed guiding pin. In this manner the degree of rotation of the specimen or model and therewith of the work piece, such as a milling cutter, will be determined by the curve plate, the configuration of the specimen or model, and the dimensioning of these two relatively to each other and relatively to the actuating lever co-operating with said curve plate. According to my invention there is further provided a feeding mechanism, which after a full revolution or after a predetermined number of reciprocating motions of said shaft will cause said model and said work piece to automatically feed a guiding pin for the model, as well as the curve plate for the adjustment of the rocking motion of the lever co-operating therewith.

In the accompanying drawings I have shown an example of the appliance according to my invention, Fig. 1 being a plan view of the new appliance, Fig. 2 an elevation thereof and Fig. 3 a top-view of the curve plate forming part of the appliance according to my invention, Figs. 4 to 11 show details of the appliance according to my invention, Fig. 4 being a detail view taken on the specimen of the work piece and the mechanism co-operating therewith, Fig. 5 a detail view perpendicular to Fig. 4, Figs. 6 and 7 showing details of the feeding mechanism, Figs. 8 and 9 showing the member intermediate between the shaft and the reciprocating mechanism therefor, and Figs. 10 and 11 show details of the lever provided on the shaft for its proper rotary motion.

Upon the base plate 1 there is mounted a bearing 2 carrying a shaft 3 provided with a worm, as shown in Figs 1 and 2, and a pulley 4 which may be driven by a belt from a source of mechanical power. The worm on the shaft 3 engages a worm-gear 5, to which the crank disc 6 is connected, said disc being provided with a crank pin 7. A connecting rod 8 serves for imparting a reciprocating motion to the shaft 12 through an intermediate member 9 as shown in Figs. 1, 2, 8 and 9. This intermediate member 9 is mounted upon one end of the shaft 12 in relatively rotatable relation thereto, said shaft again being mounted in bearings 10 and 11 permitting a rotary as well as reciprocating motion of said shaft within said bearings. The end of the shaft 12 projecting beyond the bearing 11 serves for the reception of the work piece 13, such as for instance a milling cutter as shown in the drawing; the shaft 12 furthermore carries a specimen or model of the work piece, in the case as shown a drum or roller 14 between the bearings 10 and 11, said drum or roller having a conformation which is similar to that of the work piece, that is of the milling cutter 13. Upon the shaft 12 is mounted in what may be termed rigidly resilient relation to the shaft, an actuating lever 15, as shown in Figs. 10 and 11, as well as a cam 17, as shown in Figs. 1 and 2. The free end $15^x$ of the lever 15 is guided by a curved groove 25 provided on a curved plate 16, which is mounted upon the ground plate 1. During reciprocating motion of the shaft 12 and of the drum or roller 14, which is fixedly mounted upon the former, the groove 25 on the plate 16 extending in a direction which is oblique with respect to the axis of the roller 14 and the shaft 12, will engage the free end 15¹ of the actuating lever 15 in such a manner, that during the stroke of the shaft towards the right side of Fig. 1 or 2, the end 15¹ of the lever 15 will be moved within the straight part 25ª of the groove 25 in the curve plate 16, while during the reverse stroke, that is towards the left side of Fig. 1 or 2, the end 15¹ of the lever 15 will be carried in an enlargement 25ᵇ of the groove 25 around the locking dog 26 and again be brought back into the straight part of the groove 25. The rigid guiding pin 18, as can be seen from Figs. 4, 5 and 6, is mounted within a pillar 18¹ fixed upon the ground plate 1 and serves as a positive guide for the drum 14. The lower end of said guiding pin 18 is provided with a thread, and a ratchet wheel 19 co-operates therewith by means of a corresponding female thread provided therein. The ratchet wheel 19 further co-operates with a pawl 20, which as shown for instance in Fig. 6 is connected to the part 21' of a lever 21'', 21, 21', having essentially a Z-shaped conformation. The lever 21'', 21, 21' is swingably mounted upon a pivot 19', which is fastened upon the ground plate 1 and the upper horizontal arm 21'' of said lever is equipped with a stop 22, as shown in Fig. 1, which is under the action of a spring s, said stop 22 co-operating with the cam 17 upon the shaft 12. The free end of the lever arm 21'' engages one of the ends of lever 22' of essentially U-shaped conformation, said lever 22' carrying a pawl 23 at its other end. The pawl 23 engages a ratchet wheel 24, which is keyed to a shaft 27 having a hand crank 27' mounted thereon. The shaft 27 engages an opening 28 provided in a bearing 28' on the curve plate 16, as shown in Fig. 3. An adjusting screw 29 may be provided which is mounted in a proper way in order to act against the part 21' of the lever 21'', 21, 21', for adjusting the feeding mechanism by hand in addition to the feeding motion imparted thereto by the rotary motion of the shaft 12 etc.

The appliance according to my invention may be used in connection with every existing grinding, milling, boring or similar machine and may be easily mounted thereon.

The plate 16, having a curved groove 25 therein, which corresponds to the configuration of the work piece 13 and the model or specimen 14 is mounted upon the ground plate 1 by means of the screw 16' and the model 14 which is of a conformation similar to that of the work piece 13 is placed upon the shaft 12 the cam 17 and the guiding pin 18 are adjusted by hand and brought into the required position by rotating the ratchet wheel 19. If the shaft 12 will now commence to reciprocate, the guiding pin 18 will guide the roller 14, and the shaft 12 together with the work piece 13 thereon will make also a rotary motion in addition to the reciprocating motion imparted thereto through the crank disc 6, the connecting rod 8 etc. At the end of this reciprocating motion the shaft 12 will be rotated to such an extent by the actuating lever 15 moving within the enlargement 25ᵇ of slot 25 of the plate 16, so that upon a subsequent reciprocating stroke of the shaft 12 the member 18 will be caused to enter the following groove of the roller 14. In consequence of this, now also the following groove of the work piece 13 will be subjected to the action of the fixed working tool. As soon as all grooves of the roller 14 have thus come in co-operative successive engagement with the guiding pin 18, that is to say, after the work piece 13 has made one complete revolution, the cam 17 which is fixed upon the shaft 12 will also have made a full revolution and now come in contact with the stop 22, so that by action of the pawls 20 and 23 the ratchet wheels 19 and 24 will be caused to change their position. By this the work piece 13 will be fed forward in the proper manner in order to be now exposed to a new cutting action of the tool.

If the lever 15 were rigidly fastened to the shaft 12 the drum 14 would be moved backward through the second part of the curve and in the curved plate to the same extent as it has been rotated forward through the first part of the curve. The guiding member 18 will engage the drum 14 after the lever 15 has arrived at the uppermost point of the curved part of the plate 16. If the lever 15 were rigidly connected to the shaft 12 the machine would at the point specified above come at once to a standstill. The construction of the curved plate 16 is such that the drum 14 will be rotated one-eighth of its circumference by the lever 15 and to fully utilize the rotation of the drum 14 there may be provided eight guiding grooves upon the drum 14 which correspond to a work piece having eight teeth. Therefore, a drum 14 having less number of grooves cannot be employed in the construction illustrated because the drum would have to be rotated during each working stroke by an angle which is larger than one-eighth of the circumference of the drum. While a drum having eight grooves is herein shown obviously other drums having different numbers of grooves may be employed.

The drum 14 is rotated by lever 15 only during the forward stroke of the shaft 12, that is during the passage of the lever 15 through the curved part 25$^b$ of the groove in the plate 16. During the backward stroke the drum 14 is not rotated.

The gear 12$^a$ shown in shaded lines in Fig. 10 is designed to be engaged by the spring-pressed toothed member 15$^a$ carried by the lever 15. The teeth of the gear 12$^a$ serve to hold the lever upon the shaft 12 in such a manner that said lever will be retained fixed with regard to the shaft 12 if no torque is exerted upon the lever 15 but will permit the lever to rotate in regard to the shaft if any appreciable torque is exerted on the lever.

It will thus be seen that the lever 15 serves to rotate the drum 14 forward during the forward stroke of the shaft 12 by a distance which is equal to the pitch of the teeth or cutting edges of the drum 14. If the lever 15 were not provided no rotation of the drum could take place and the guiding pin 18 would travel in the same groove of the drum.

I claim:

1. An appliance for grinding, milling, boring machines and the like, comprising a shaft adapted to carry the work piece; a model corresponding to said work piece and carried by said shaft; means for imparting a reciprocating motion to said shaft, means for imparting rotary motion to the shaft, and to said work piece; said means comprising an actuating lever mounted upon said shaft, a curved plate engaging the free end of said actuating lever, and a guiding pin engaging said model; and a feeding mechanism for feeding said guiding pin and said curve plate upon a full rotary motion of said shaft, substantially as described.

2. An appliance according to claim 1, having a feeding mechanism which consists of a pivotally mounted Z-shaped lever with two arms, a cam mounted on the shaft and adapted to engage after each full revolution thereof one of said arms of said Z-shaped lever, and a pair of pawl and ratchet mechanisms adapted to be actuated by said lever, one of said mechanisms being interposed between said Z-shaped lever and said curve plate, the other of said mechanisms being interposed between said Z-shaped lever and said guiding pin, substantially as described.

3. An appliance for grinding, milling, boring machines and the like, comprising a shaft adapted to carry the work piece; a model corresponding to said work piece and carried by said shaft; means for imparting reciprocating motion to said shaft, means for imparting rotary motion to the shaft and to said work piece; said means comprising an actuating lever mounted on said shaft, a curved plate engaging the free end of said actuating lever, a guiding pin engaging said model, and a feeding mechanism for feeding said guiding pin and said curved plate, said mechanism comprising a pivotally mounted Z-shaped lever with two arms, a cam mounted on the shaft and adapted to engage after each full revolution thereof one of said arms of said Z-shaped lever, a pair of pawl and ratchet mechanisms adapted to be actuated by said lever, one of said mechanisms being interposed between said Z-shaped lever and said curved plate, the other of said mechanism being interposed between said Z-shaped lever and said guiding pin, and a U-shaped lever interposed between said Z-shaped lever and said pawl and ratchet mechanisms for the curved plate.

4. A feeding mechanism according to claim 3 having an adjusting mechanism whereby said curved plate may be adjusted by hand in addition to the feeding motion imparted thereto.

5. A feeding mechanism according to claim 3 having an adjusting mechanism whereby said curved plate may be adjusted by hand in addition to the feeding motion imparted thereto, and an adjusting mechanism whereby said guiding pin may be adjusted by hand in addition to the feeding motion imparted thereto.

6. An appliance for milling machines according to claim 1, having a work piece and a model in the form of a milling cutter, and a pivotally mounted curve plate adapted to co-operate therewith, said curve plate having a groove of essentially straight configuration serving for the reciprocating motion of said shaft, said milling cutter and said model, said groove having an enlargement carrying a locking dog, and means carried by said shaft for engagement with said enlargement and serving to cause rotary motion of said shaft, said milling cutter and said model.

7. An appliance according to claim 3 having an adjusting screw for adjusting said feeding mechanism by hand in addition to the feeding motion imparted thereto by the rotary motion of said shaft.

In testimony whereof I have affixed my signature.

CARL OTTO WEBER.